United States Patent
Stigwall et al.

(10) Patent No.: US 10,282,855 B2
(45) Date of Patent: May 7, 2019

(54) DETERMINING OBJECT PROPERTIES WITH RESPECT TO PARTICULAR OPTICAL MEASUREMENT

(71) Applicant: HEXAGON TECHNOLOGY CENTER GMBH, Heerbrugg (CH)

(72) Inventors: Johan Stigwall, St. Gallen (CH); Thomas Jensen, Rorschach (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 0 days.

(21) Appl. No.: 15/610,511

(22) Filed: May 31, 2017

(65) Prior Publication Data

US 2017/0365065 A1 Dec. 21, 2017

(30) Foreign Application Priority Data

Jun. 17, 2016 (EP) .................................. 16174909

(51) Int. Cl.
*G06T 7/40* (2017.01)
*G01B 11/25* (2006.01)
(Continued)

(52) U.S. Cl.
CPC .............. *G06T 7/40* (2013.01); *G01B 11/005* (2013.01); *G01B 11/2518* (2013.01);
(Continued)

(58) Field of Classification Search
None
See application file for complete search history.

(56) References Cited

U.S. PATENT DOCUMENTS

| 6,611,617 | B1* | 8/2003 | Crampton | G01B 11/2518 356/614 |
| 6,668,082 | B1* | 12/2003 | Davison | G06T 7/55 345/419 |
| 6,990,228 | B1* | 1/2006 | Wiles | G06T 17/10 345/419 |
| 8,594,425 | B2* | 11/2013 | Gurman | G06K 9/00201 382/154 |

(Continued)

FOREIGN PATENT DOCUMENTS

DE 10 2004 026 090 A1 12/2005
EP 0 840 880 A1 5/1998
(Continued)

OTHER PUBLICATIONS

European Search Report dated Nov. 14, 2016 as received in Application No. 16174909.8.

*Primary Examiner* — Soo Shin
(74) *Attorney, Agent, or Firm* — Maschoff Brennan

(57) ABSTRACT

A method of identifying a surface point or region of an object to be measured by means of an optical sensor providing defined measuring conditions regarding emission of measuring light and reception of reflected measuring light in a defined spatial relationship. The method comprises defining a point or region of interest of the object, determining an optical property of the defined point or of the defined region and deriving an object information base on the optical property. The determination of the optical property is performed by optically pre-measuring the point or region using the optical sensor by illuminating the point or the region with the measuring light, capturing at least one image by means of the optical sensor of at least one illumination (Lr,Li) at the object and analyzing respective illuminations (Lr,Li) regarding position or appearance plausibility with respect to the measuring conditions of the optical sensor.

12 Claims, 8 Drawing Sheets

(51) Int. Cl.
*G01B 11/00* (2006.01)
*H04N 5/225* (2006.01)
*G06T 7/55* (2017.01)
*G06T 7/73* (2017.01)
*G06T 7/11* (2017.01)
*G06T 7/521* (2017.01)
*G06T 7/593* (2017.01)

(52) U.S. Cl.
CPC ............ *G01B 11/2545* (2013.01); *G06T 7/11* (2017.01); *G06T 7/521* (2017.01); *G06T 7/55* (2017.01); *G06T 7/593* (2017.01); *G06T 7/74* (2017.01); *H04N 5/2256* (2013.01); *G06T 2207/10028* (2013.01); *G06T 2207/20021* (2013.01); *G06T 2207/30244* (2013.01)

(56) References Cited

U.S. PATENT DOCUMENTS

| | | |
|---|---|---|
| 2011/0211066 A1 | 9/2011 | Fujiki |
| 2014/0078490 A1* | 3/2014 | Higo ...................... G01B 11/25 356/4.01 |
| 2014/0307085 A1 | 10/2014 | Ohsawa |
| 2015/0206023 A1* | 7/2015 | Kochi ...................... G01B 11/00 382/199 |
| 2015/0371391 A1* | 12/2015 | Ding ...................... G06T 17/10 382/141 |
| 2016/0054119 A1 | 2/2016 | Kanto |

FOREIGN PATENT DOCUMENTS

| | | |
|---|---|---|
| WO | 2007/125081 A1 | 11/2007 |
| WO | 2011/000435 A1 | 1/2011 |

\* cited by examiner

DETERMINING OBJECT PROPERTIES WITH RESPECT TO PARTICULAR OPTICAL MEASUREMENT

FIELD OF THE INVENTION

The present invention generally pertains to a method and device for characterising a surface of an object, in particular regarding reflection properties of the surface, with view to particular triangulation measurement of the surface.

BACKGROUND

It is common practice to inspect work pieces subsequent to production e.g. on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

An advantage of using a line triangulation device in combination with a CMM for measuring a surface is the amount of distance information being received by one time step, i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems (e.g. articulated arm CMMs), comprising typically four segments linked together with one or two rotation axes per linkage and a total of six or seven axes, have become popular for non repetitive measurement tasks on the shop floor. Line triangulation device are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data is acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner. Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and read out the image. An image of the reflected light is captured and distance information according to the contour of the detected line is derived. Based thereon, topography of the object's surface can be determined.

For triangulation measurements with high precision, an illumination and detection of respectively reflected light has to be provided which comprises a required level of illumination and an adequate detection of the light information. For adjusting illumination so that the reflected light reaches the detector meeting its respective detection properties (e.g. signal-to-noise level and saturation limit) WO 2011/000435 A1 discloses an approach of an in-advanced illumination in order to determine a suitable illumination level for the measuring light. WO 2007/125081 A1 discloses a further approach for actively controlling the power of illuminating light in dependency upon an intensity detected by a camera.

However, in case of regions to be illuminated which significantly differ regarding their reflecting properties there still remains the problem of providing a usable signal over the whole width of a projected laser line. Particularly, surfaces with low roughness, i.e. mirror-like surfaces such as chrome, are difficult to measure due to strong inhomogenity of the reflected light toward the image sensor. In such cases, a suitable illumination still will reach its limits and, therefore, the precision of derived distance data would be further be low.

Therefore, there remains a problem in identifying regions on the object which provide good reflectance with view to projected measuring light and other regions which may probably be difficult to measure e.g. due to double reflections.

SUMMARY

It is therefore an object of the present invention to provide an improved method and a respective triangulation measuring device for enabling a determination of measuring conditions at an object to be measured.

Another object of the present invention is to provide a corresponding method for detecting double reflections at the object.

Fringe projection is a triangulation technique where a large number of 3D points are acquired in a short time by projecting a sequence of area-covering patterns while the projector and camera are stationary relative to the work piece. Typically, the patterns are "stripes" perpendicular to the baseline direction, and for each direction the sequence defines a unique binary code so that the illumination direction can be decoded by analyzing the temporal signature on each individual camera pixel. Typically, the binary code is complemented by a sinusoidal "phase-shift" code which shifts relatively fine stripes by small increments to enable sub-pixel precise encoding without having to project patterns with too high spatial frequencies. FIG. 1 shows an example of such a phase-shifted code, wherein the pattern sequences and their numbers are shown over the projector pixel columns.

One other known pattern sequence consists of two high-frequency sinusoidal patterns with a small difference in spatial frequency which are both phase shifted. This pattern is less affected by diffuse or "semi-shiny" inter-reflections since the contrast of the high-frequency stripes is reduced significantly after reflection.

A fringe projection sensor has at least one projector and at least one camera. Some sensors have two cameras and one projector since this allows high accuracy triangulation between the two cameras even if the projector is unstable (e.g. due to self-heating), has high lens distortion etc. With a high quality (=stable) projector, the mentioned 2+1 setup also may increase coverage around edges and on shiny surfaces by performing triangulation between all three pairs of devices.

In case of projection of one line, there is for each light pixel in one camera or projector a corresponding "epipolar line" in a second camera. The epipolar line is the image of the projection defined by a pixel location, and when searching for a match in the second camera one can thus limit the search to this line. Since one degree of freedom is known directly from this relationship it is only necessary to encode the projected pattern "along the baseline". In the other direction, the pattern can be constant "stripes".

Since the codes for different stripes may not be "orthogonal" it could be difficult to extract useful information in cases where reflections on the work piece cause superposition of several codes. E.g. one projector pixel column may emit the intensity code 010101 and another 011001. If these are superposed with equal weights the detected code would be 021102 and it would not be possible to rule out e.g. the incorrect superposition 011101+010001. In an even worse case, the superposed code may have no variation in intensity (e.g. 100+010=110) and it will thus not even be possible to detect that there is a reflection. Luckily, the risk of this happening can be diminishing with code length, and thus could be limited to 10% for an 8-bit code.

Two other types of triangulation sensors are laser line triangulation sensors and laser point triangulation sensors. Both of these have fundamental advantages over fringe projection when it comes to handling of inter-reflections since only one line or even one point is illuminated at once. In the first case, reflections typically become spatially separated from the primary signal and can be removed by (non-trivial) image processing. In the second case, most secondary reflections are not even in the field of view of the single-line camera, and are thus automatically disregarded.

Although a reflection within an epipolar plane is possible, it is much more likely that the reflected light comes from some other plane. To detect such reflections one can perform a second scan with the fringes extending along the baseline instead of across. If the detected code is not as expected for a direct reflection, one can decide either to disregard this point or e.g. to only perform camera-to-camera triangulation.

Generally on a very shiny work piece with a complex shape there may be any number of inter-reflections at the surfaces.

However, there are at least two typical cases of occurring reflections:
1. The projected pattern is reflected by a primary reflection from a shiny surface onto a secondary diffuse surface.
2. The camera sees a mirror image of primary diffuse surface through a secondary mirror-like reflecting surface.

Where "primary" means the surface first struck by the light of the projector, secondary the second surface etc.

In the first case it is still possible to perform triangulation (photogrammetry) between the two cameras since at this point of the work piece they will see exactly the same (overlaid) patterns like a texture on the surface. Triangulation between camera and projector will however not work well since multiple projection directions are superposed.

In the second case, not even camera-to-camera triangulation is possible since each camera sees a different mirror image.

Today such situation would be avoided by covering the shiny surface with a removable paint. This causes additional uncertainties due to the thickness of the layer and efforts in the preparation and removal of it.

In both cases, it would be helpful to reduce the extent of the project pattern so that only one of the surfaces is illuminated at a time. One objective of the present invention is a method for segmenting the scene and projection pattern so that inter-reflections are avoided.

Thus, another objective of the invention is a combination of projection patterns and processing algorithms to detect inter-reflections. This is to support a segmentation and reduce the number of erroneous points.

Yet another object of the invention is to avoid any artificial surface treatments and to achieve robust and reliable measurement results.

Above objects are achieved by realising the features of the independent claims. Features which further develop the invention in an alternative or advantageous manner are described in the dependent patent claims.

In general, some embodiments of the invention relate to a method of identifying a surface point or region of an object to be measured, the point or region being of particular measuring properties for optical measurement of the respective point or region by means of an optical sensor. Preferably, points or regions of ambiguous, undefined or problematic measuring conditions can be identified by means of the method. In particular, the optical sensor is designed as a triangulation-based fringe- or pattern projection optical sensor. The optical sensor provides defined measuring conditions at least regarding emission of measuring light and reception of reflected measuring light in a defined spatial relationship. In particular, a type, shape and size of a projected pattern (e.g. line or grid) are well known.

The method comprises the steps of defining a point or region of interest at the object, determining a surface property related to an appearance of the defined point or of at least a part of the defined region with respect to a particular optical measurement using the optical sensor and deriving an object information about measurability applying the defined measuring conditions base on the surface property, the object information representing an information about an expected effect on the particular optical measurement due to the surface property.

The region of interest typically comprises a number of planes (surfaces) of the object which are oriented to each other with defined tilt.

According to the invention the determination of the optical behaviour of the point or region is performed either by optically pre-measuring or by analysing a digital model or by a combination of both.

Optical pre-measuring of the point or at least a part of the region is performed by use of the optical sensor.

The point or at least a part of the region is illuminated with the measuring light emitable by the optical sensor. At least one image is captured by means of the optical sensor of at least one illumination at the object caused by illuminating the object and respective illuminations (the at least one illumination) are analysed regarding position and/or appearance unambiguity (plausibility) with respect to the measuring conditions of the optical sensor.

In other words, the illumination on side of the object can be analysed regarding its position at the object, its shape, size and possible distortions or the like. The type of measuring light, i.e. type, shape, dimension of a pattern and/or direction of projection, typically is pre-known. The optical sensor preferably comprises at least one camera having a photo-detector for acquiring image information like an image of a projected pattern.

In particular, by applying a defined illumination, the appearance of superimpositions of illumination patterns at the surface can be recognised. If the captured pattern does not comprise unambiguous conditions (contrast, size, shape etc.) this may be a hint on occurring superimpositions or other undesired illumination effects like double reflections.

On the other hand, an analysis of the digital model of the object to be measured is executed by digitally or virtually aligning the digital model in accordance with an in-reality orientation of the object relative to the optical sensor according to a given measuring constellation. Appearance properties of the point or region are determined based on the aligned model regarding an illumination with the measuring light from the optical sensor in the orientation of the object relative to the optical sensor.

With such approach surface properties of the object can be determined by use of a respective algorithm and an expected effect on a planned measurement can be derived based only on such model-analysis. In particular, reflection (and roughness) properties of the analysed region are known, e.g. from a CAD-model.

According to some embodiments of the invention, the optical pre-measuring comprises determining at least one image-position in the at least one image of respective illuminations at the object, checking for positional plausibility of the at least one image-position with respect to the measuring conditions of the optical sensor, in particular by considering an axis of illumination of the sensor, and generating position unambiguity information based on the checked positional plausibility.

In case the projected pattern (point, line or grid etc.) appears at the object at a position which would be expected due to a position and orientation of the sensor relative to the object, such appearance is detected and recognised by applying the method. In such case, for instance double reflections of a projected pattern can be excluded to a significant probability.

However, in case an illumination is detected at a position different to an expected position this can be an evidence for the occurrence of double reflections when illuminating the object accordingly and, hence, reduced measuring quality can be expected with an optical measurements of the object as planned there.

Hence, "unambiguity information" means information about if the pattern occurring at the object appears there in a way as expected and desired, i.e. basically in a way as generated on side of the optical sensor, or if the pattern is different to an expected pattern, e.g. due to reflections between exposed surfaces. Therefore, the unambiguity information is kind of a measure of plausibility of appearance of the pattern at the object.

According to some embodiments of the invention, image data of the at least one illumination can be generated, the image data comprising at least two pictorial representations of the at least one illumination at the object from at least two different poses. For each of the pictorial representations the at least one image-position of the respective illuminations at the object can be determined and the image-positions can be checked for consistency regarding the measuring conditions.

In particular, one can check if the image-positions represent a common illumination based on an illumination direction for the measuring light.

In further embodiments of the invention, a spatial position derived by a triangulation-based determination based on the image-positions, in particular by means of photogrammetry, is compared with a position of an illumination axis or illumination plane of the measuring light. In particular, one can check if the position derived by the triangulation-based determination lies on the illumination axis or the illumination plane.

For instance, each of the two cameras of an optical sensor provides an image which covers one illumination at the object (as image data). For each image an image-position (in the image) for the covered illumination can be determined (e.g. with respective image coordinates, e.g. related to the planar dimensions of image sensors). Considering a known spatial relationship of the cameras (and e.g. by rough knowledge about the shape and size of the object to be measured), one can, e.g. based on photogrammetric approaches, determine if the position of the illumination at the object is plausible (unambiguous) or if such illumination would be caused due to ambiguous reflection effects. In particular, in course of such determination a position and orientation of an epipolar line (e.g. by considering a respective illumination axis or the illumination plane or a virtual line defined by one of the determined image-positions) can also be considered in order to more efficiently determine if the covered illumination is plausible in light of given measuring conditions or not.

Concerning the illumination of the object, according to an embodiment of the invention, the illumination of the point or region is provided by the measuring light being in form of a line of light, a light pattern (e.g. a line pattern having at least two lines being transversely, in particular orthogonally, aligned to each other), or a light spot. A projection patter can for example be represented by a laser line grid.

According to some embodiments of the invention, the optical pre-measuring comprises moving the measuring light over the object according to a defined scanning path, in particular in defined scanning direction, continuously detecting a position of an illumination caused by the moving measuring light at the object, deriving a movement path for the illumination at the object, in particular an object moving direction, comparing the scanning path to the derived movement path and generating position unambiguity information based on the comparison.

Applying such an approach enables to detect a (double) reflected illumination at the object due to differing moving directions of the projected and detected illumination. An illumination at the object which e.g. is mirrored moves in a different direction than the one directly projected onto the object.

Ambiguous measuring conditions can also be identified according to the invention by analysing contrast and/or intensity of the at least one captured illumination, comparing the contrast and/or intensity to a respective reference value and generating appearance unambiguity (plausibility) information based on the comparison.

A projected pattern which is directly reflected back and detected by the cameras of the sensor comprises a contrast and/or intensity which significantly differs from contrast and/or intensity of the pattern being first reflected from a first surface region of the object onto a second surface region of the object and afterwards detected with the cameras, i.e. the illumination caused at the second surface region is captured by the cameras. The contrast and/or intensity may for instance be reduced due to superimposition of the directly projected pattern and the reflected pattern at the second surface region.

In particular, the reference value is defined by a contrast level of one of the illuminations generated or captured at the object. Moreover, the reference value may also be represented or derived by a contrast or intensity level which can be expected with a respective illumination. Preferably, object properties like material or surface finish of the object are considered here as well.

According to embodiments of the invention the point or region can be illuminated with measuring light defining a fine pattern with successive bright and dark illumination regions.

Regarding the definition of the point or region of interest of the object according to the invention, a first polygon in a first camera view and a second polygon in a second camera view of the object can be defined. The first and the second polygon define (at least partly) a common region at the object. Topographic information of the common region is derived based on photogrammeric processing using the first and the second camera view. In particular, the topographic information is referenced with a projector coordinate frame of the optical sensor.

According to some embodiments of the invention, the point or region of interest can be defined by use of a coaxial view to the object, wherein a viewing axis of the coaxial view basically corresponds to an emission axis of the measuring light, in particular wherein the optical sensor comprises a light emitting unit adapted to provide emission of the measuring light according to the emission axis and a camera adapted to provide reception of the reflected measuring light according to the viewing axis, wherein the emission axis of the light emitting unit and the viewing axis of the camera are coaxially aligned, in particular wherein the camera is represented by a light receiving unit of the optical sensor.

For instance, an additional camera may be provided the optical axis of which may be coupled to the projector's optical axis for providing coaxial optical alignment.

With respect to the present invention the optical measuring can be performed as a pre-scanning process for the point or region of interest. I.e. the method according to the invention can be executed in advance of a later measurement of the object in order to derive particular measurement parameters to be chosen for obtaining reliable measurement results for a respective point or region at the object.

Concerning the analysis of the digital model, according to an embodiment of the invention, the digital model is segmented into defined pieces of the model each of which representing a part of the object, in particular using a segmentation grid. The model is analysed concerning surface properties of the object, parts of the object with similar or identical surface properties are determined and the parts of the object with similar or identical surface properties are referenced in respective pieces of the model.

The result is for instance a grid, wherein in each of the segments defined by the grid a respective part of the object which comprises defined surface properties (e.g. reflection behaviour) is identified and/or marked. Based on such segmentation, measurements can be planed to be performed in a way such that suitable measuring conditions are chosen or applied for measurements of the identified areas within respective segments. By that more reliable and faster measurement of respective parts of the object can be provided.

In particular, the parts of the object with similar or identical surface properties are assigned to a first group, particular measuring properties are defined for the first group and triangulation measurement of the first group are performed by applying the defined particular measuring properties.

Of course, there may be defined more than one group, wherein parts of the object assigned to a respective group comprise similar measuring conditions and thus require particular measuring parameters. In particular, each group defines different measuring conditions.

As mentioned above, the method according to the invention is a pre-determination method for providing suitable measuring parameters for later detailed measurements with the optical sensor. In other words, the method provides determination of the surface property of a surface region at the object with respect to defined sensor properties and to a defined alignment of the sensor relative to the object, wherein measuring parameters of the sensor (for a successive detailed measurement of the surface) are set on basis of such pre-determined surface property or conditions. Hence, the derived surface property may be valid for a specific arrangement of object and sensor only.

The invention also relates to a triangulation-based optical sensor, in particular fringe- or pattern projection optical sensor, with which a method of above can be performed. The optical sensor comprises a light emitting unit with a light source, in particular a laser diode, for providing defined measuring light, in particular a light pattern, at least one light receiving unit, e.g. a camera, having a detector, e.g. a CCD-detector, for detecting measuring light reflected and received from an object to be measured and a controlling and processing unit for deriving distance information based on the detected reflection. At least an arrangement of the light emitting unit and the light detection unit with known spatial position and orientation relative to each other, in particular according to the Scheimpflug criterion, defines measuring conditions of the optical sensor. It is to be understood that such measuring conditions may further be defined by specific properties of a generated light pattern or by a detection sequence of a camera.

According to the invention, the controlling and processing unit comprises a pre-measuring functionality by execution of which a determination of an object surface property related to an appearance of a defined point or of at least a part of a defined region of the object with respect to a particular optical measurement using the optical sensor is performed. The pre-measuring functionality is performed by either optically pre-measuring the point or region or by analysing a digital model of the object to be measured or by a combination of both.

Optically pre-measuring is performed by illuminating the point or at least a part of the region with the measuring light, capturing at least one image by means of the light receiving unit of at least one illumination at the object caused by illuminating the object and analysing the at least one illumination regarding position and/or appearance unambiguity (plausibility) with respect to the measuring conditions of the optical sensor. Analysing the digital model is performed by digitally aligning the digital model in accordance with an (in-reality) orientation of the object relative to the optical sensor and determining appearance properties of the point or region based on the aligned model regarding an illumination with the measuring light in the orientation of the object relative to the optical sensor.

In particular, the pre-measuring functionality is adapted to execute a method as described above or below.

According to some embodiments of the invention, the light emitting unit is embodied as a projector and defines an emission axis, the triangulation-based optical sensor comprises a camera which defines a viewing axis, in particular wherein the camera is represented by the at least one light receiving unit. A projector object surface of the projector and a camera image sensor of the camera are arranged so that the emission axis and the viewing axis are coaxially aligned. In particular, the projector and the camera are arranged so that the emission axis and the viewing axis are coaxially aligned.

In particular, the triangulation-based optical sensor, in particular the light emitting unit, comprises an optical assembly, wherein the optical assembly comprises at least a beam splitter and a lens for providing the emitting and the viewing axes to be coaxially aligned. E.g. the optical assembly may be designed with one beam splitter and two lenses, a first of the two lenses providing an adequate image to the camera and a second of the lenses providing desired projection onto the object. Moreover, the projector object surface and the camera image sensor (in particular the camera) are integrally arranged within the projector.

Some embodiments further relate to a computer program product having computer-executable instructions implemented for executing and controlling at least the step of determination of the surface property of method described herein above or below. The determination of the surface condition comprises optically pre-measuring the point or region using the optical sensor and/or analysing a digital model of the object to be measured of the respective method. In particular, the computer program product is implemented on or provided (e.g. provided by a data server unit or cloud) to a controlling and processing unit of an optical sensor.

BRIEF DESCRIPTION OF THE FIGURES

The method according to the invention is described or explained in more detail below, purely by way of example, with reference to working examples shown schematically in the drawings. Specifically.

DETAILED DESCRIPTION

Figure 1:
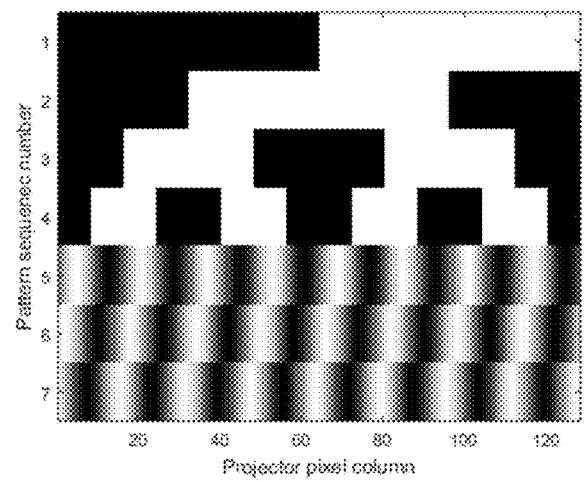
FIG. 1 shows a pattern of phase-shifted code, wherein the pattern sequences and their numbers are shown over the projector pixel columns.
Figure 2:
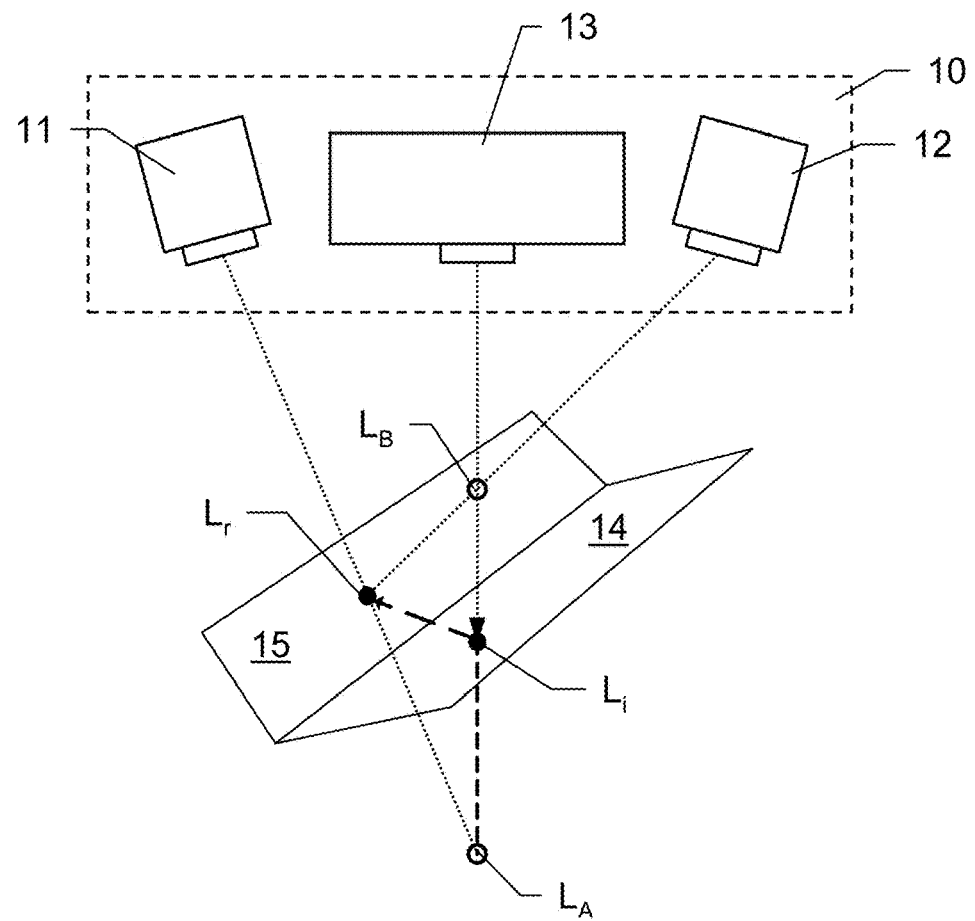
FIG. 2 shows the effect of a reflection caused by illuminating a shiny surface of an object.

FIG. 2 shows the effect of a reflection caused by illuminating a shiny surface 14 of an object, for simplification with a single point.

An incident spot $L_i$ projected by a 2D projector 13 of a triangulation sensor 10 on shiny tilted surface 14 causes a double reflex $L_r$ on a second matt surface 15 (i.e. the region of interest comprises at least parts of both surfaces 14,15 which can be captured by the cameras). As a consequence the determination of the point directly illuminated by the spot on the object is no longer unambiguous due to the second reflex $L_r$. It is also likely, that the second reflex $L_r$ appears brighter due to a stronger scattering of the matt surface 15. Without any further analysis this setup would cause an outlier in the measurements or even a larger region of the shiny 14 and matt surface 15 will not be measurable.

The projection direction passing point $L_i$ corresponds to an epipolar line in the image plane of the cameras 11,12.

Along this line the location of the projection is determined in 3 D coordinates.

Camera 11 will identify $L_A$ as the virtual location of the reflex location $L_r$ and for camera 12 this will be the virtual location $L_B$. The inconsistency of the two locations $L_A$ and $L_B$ is a direct indication of a misleading due to the double reflex. Such double reflex represents a property of the respective surfaces, in particular surface 14. The region (both surfaces) can be defined as a double reflecting region.

According to the invention such an inconsistency is checked based on the knowledge of possible positions of the projected spot due to a given projection direction and based on the given relative position and orientation of the cameras 11,12 and the projector 13. Respective images captured by the cameras 11,12 are compared to each other, wherein image-positions of the two locations $L_A$ and $L_B$ are determined in the images. Considering the camera orientations and the projection axis the result here would be that the locations $L_A$ and $L_B$ do not represent one single spot at the object but would have to be assigned to two different positions at the object. As there is only one single spot projected such result gives information about occurrence of ambiguous measuring conditions there.

As a consequence a planned measurement of the illuminated position can be adjusted based on the identification of such ambiguity. E.g. a pattern to be projected of an angel of incidence may be adjusted to prevent a significant or dominant double reflex.

Figure 3:
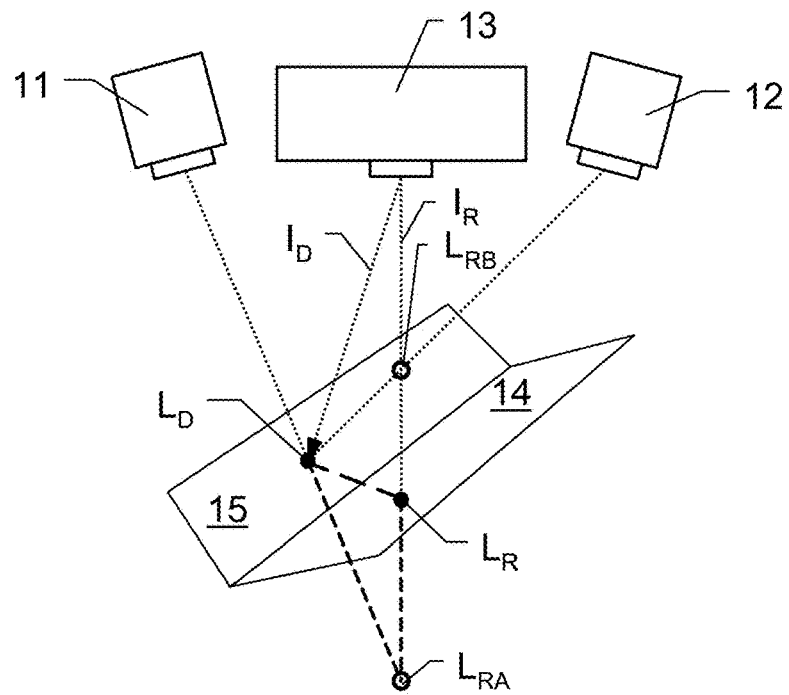
FIG. 3 shows another example for occurring reflections on a particular surface.

In FIG. 3, the point to be measured is $L_D$ which is directly illuminated by the ray ID. Superposed with the directly reflected light, the cameras also see light from the $I_R$ ray which is reflected from the shiny surface 14 at location $L_R$. Depending on the surface properties of the two surfaces 14,15 (=region of interest), either the direct or the reflected light may be stronger. For an ideal matte surface the intensity relationship should be the same seen from both cameras 11,12, but for "semi-matte" surfaces this may not be exactly the case. If the reflected light is decoded and triangulation performed against the projector 13, camera 11 will think that it comes from location $L_{RA}$ and camera 12 will think that it comes from $L_{RB}$, which is an invalid situation since the projector cannot illuminate both of these points at the same time (a surface at $L_{RB}$ would shadow $L_{RA}$).

However, when performing triangulation between the two cameras 11 and 12, the correct location $L_D$ will be found since both cameras 11,12 see essentially the same pattern.

Again, uncertainty in defining a correct and unambiguous object location related to the projected spot can be found by comparing respectively identified image-positions of the spot in a first image captured by camera 11 and in a second image captured by camera 12. In particular, knowledge of the orientation of the projected laser beam and/or the orientation and position of a virtual epipolar line is considered with that process.

Figure 4:
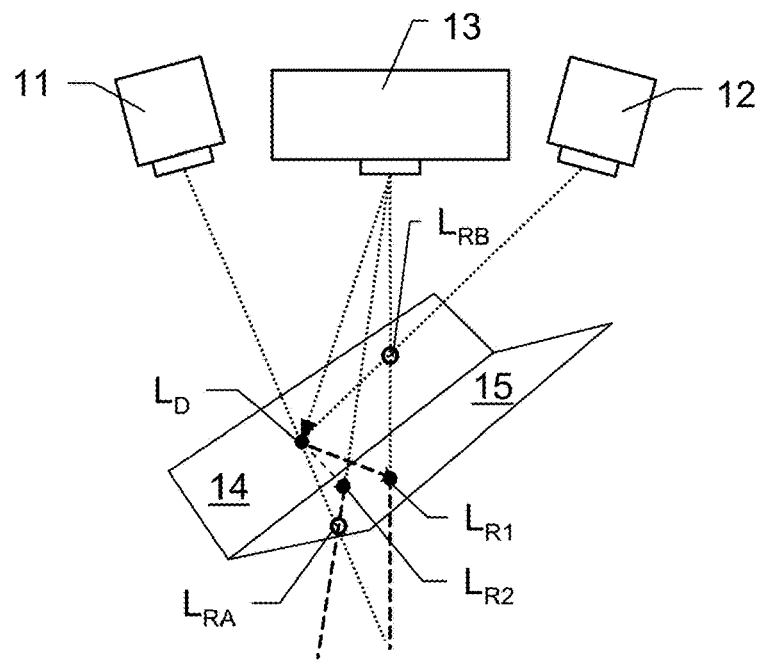
FIG. 4 shows a further problematic occurrence of reflections caused by illumination by means of a projector of an optical sensor.

FIG. 4 shows a further problematic occurrence of reflections caused by shiny surfaces. It is intended that point $L_D$ is observed by the two cameras 11 and 12. Due to the reflection of the shiny surface 14 the observation is mirrored to the matt surface 15. In this way the image at point $L_D$ is occurring from point $L_{R1}$ for camera 12 and from $L_{R2}$ from camera 11. At these locations the projector will illuminate different patterns which will cause a complete misinterpretation in the analysis of the two camera images. The analysis of camera 11 will yield to a location $L_{RA}$ (crossing of the epipolar line of the projector with the viewing direction of the camera) and for camera 12 to a location $L_{RB}$. From this discrepancy one can conclude an appearance problem of the observed surface.

Hence, here ambiguity is given by multiple reflections of the initially generated spot $L_D$. According to the invention such ambiguity can be dissolved by image processing and comparing respective image-positions.

Each of above examples shows particular difficulties in measuring respective objects which provide such or similar surface conditions, in particular in combination with a respective orientation of the object relative to a measuring sensor, e.g. to a triangulation sensor. In the following, approaches (as partly already outlined above) of identifying problematic regions at an object to be measured according to the invention are described in more detail.

Triangulation with a single point of illumination is the most robust approach to detect reflections but also the slowest. Thanks to area scan cameras in a fringe projection sensor it is also in many cases possible to see where the secondary reflections occur. A quick low resolution pre-scan over the object with a single projected point observed by two cameras will show directly where problematic surfaces are that cause double reflexes due to inconsistency of the reflex-positions between the cameras as described above. Depending on the complexity of the object several points might be projected simultaneously onto the object to reduce scanning time.

To further increase speed while still being robust on shiny surface more than full area fringe-projection one could perform the pre-scan using a continuous line instead of a point, thus capturing e.g. 1000× as much data per image frame. In the acquired images one will see both the primary line as well as reflections of the same. By using methods known from laser line triangulation sensors it is in many cases possible to determine which line is the primary one and for instance thus generate a 3D model of the object.

Especially when using two cameras it is easier to detect double reflection since only points on the primarily illuminated plane are consistent when triangulating each camera against the projector. This approach will not work for double reflexes appearing within the illuminated plane (along the projection line). A second perpendicular scan can be performed to remove this uncertainty.

Unlike for point projection, it is however not as easy to determine from which primary point each reflected point originates, so segmentation (identification or definition of particular regions or zones) based on information from a line projection pre-scan is more difficult. Just as for point projection, in some cases it may be possible to increase scan speed by projecting multiple lines at once.

Because double reflections appear only on secondary surfaces that are somehow tilted to the first surface, the movement of the projection pattern (either a point, line, or fringes) will appear on the second surface in a direction in which the scanning path on the first surfaces will cross the extrapolated tilted second surface. Thus, by detecting a movement of a reflection at the object and comparing a movement direction to a direction of scanning the laser line or spot relative to the object one could determine if the detected reflection is a primary or a secondary reflection.

Figure 5:
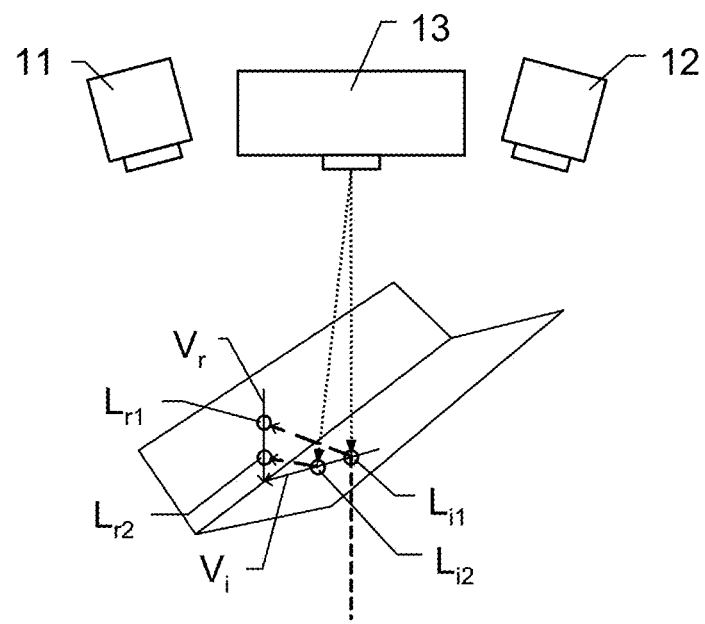
FIG. 5 shows a principle of detecting reflections by means of defined movement of a projection at the object.

Above approach is also shown with FIG. 5. By shifting the projection direction (scanning) from point $L_{i1}$ to $L_{i2}$ along the scanning vector direction $V_i$ the reflection moves from point $L_{r1}$ to $L_{r2}$ along the reflex vector direction $V_r$ which has a vector component that is perpendicular to $V_i$.

Figure 6A:
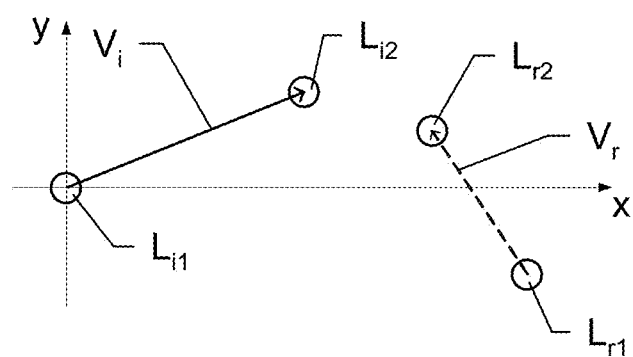
FIG. 6a-b show vector diagrams related to reflection identification by scanning.
Figure 6B:
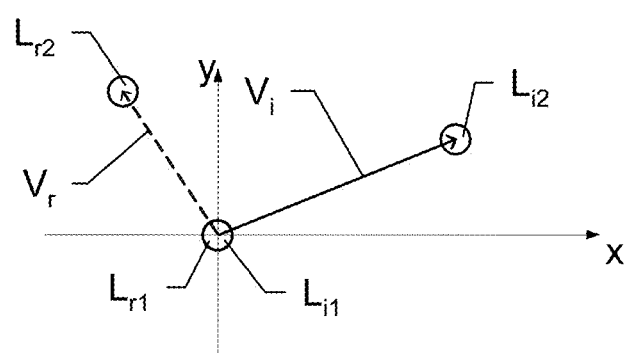

FIGS. 6a and 6b show vector diagrams related to such identification by scanning. Scanning on a flat object perpendicular to the optical axis of the projector and observed by a camera defines the x-axis. Now in case the object is tilted the scanning path observed by the camera will no longer be along the x-axis but will have a component in y-direction. This is shown for the first surface by the vector $V_i$ alongside the point moves from $L_{i1}$ towards $L_{i2}$ (assuming the surface is plane between these two points). In parallel, the reflex location on the second surface will move from $L_{r1}$ to $L_{r2}$. For visualization the starting locations of $L_{i1}$ and $L_{r1}$ are shown placed at the origin of the coordinate system in FIG. 6b. Knowledge about such behaviour also enables to distinguish an initially desired illumination from a (secondary) reflection of such projection.

The vector $V_r$ has a component along the x-axis that is opposite towards $V_i$. It will be always on the left side of the coordinate system defined by the scanning direction of the primary point.

This opposite behaviour and form of incident and reflected pattern is also represented by the orientation of the pattern in respectively captured images. Due to the mirroring, movement in the projected pattern (phase shift) will change direction after reflection so that the axes of the projected pattern (projector pixel axes) in the reflection will be rotated and/or mirrored. Such effect is shown in context of FIGS. 7a and 7b.

Figure 7A:
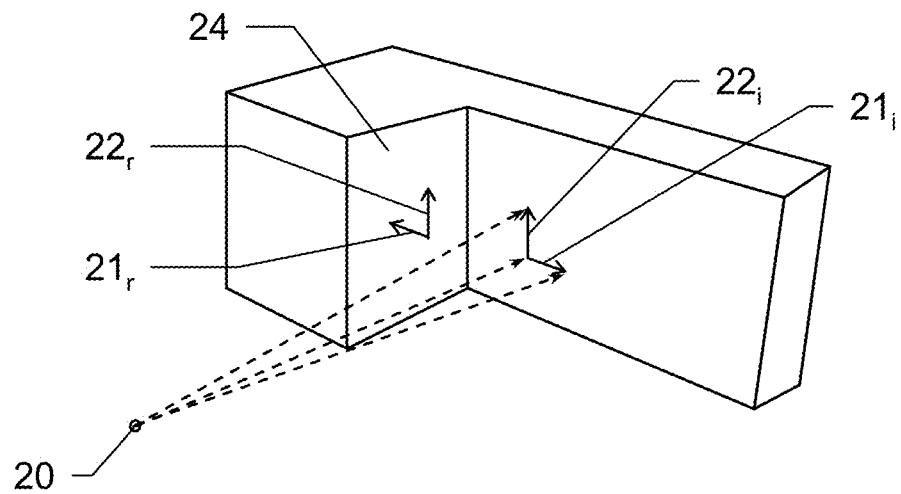
FIG. 7a-b show the effect and handling of patterns caused by shifted or mirrored projections.

FIG. 7a shows an illumination of an object with a pattern represented by two arrows $21i$ (projector x-axis) and $22i$ (projector y-axis) generated and emitted from a projection centre 20 of a respective projector as e.g. shown as triangulation sensor 10 in FIG. 2. The initially projected pattern is mirrored at a shiny surface 24 of the object. As a consequence a respectively mirrored pattern represented by the mirrored (reflected) arrows $21_r$ and $22_r$ can be imaged at the surface 24.

Figure 7B:
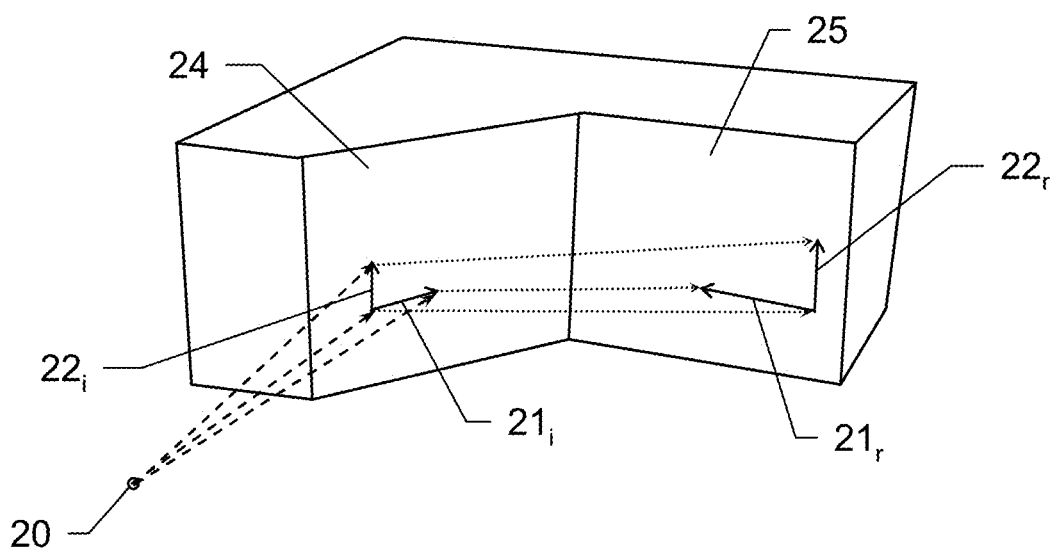

FIG. 7b shows an object being illuminated with a pattern again represented by the arrows $21_i$ and $22_i$. The illuminated surface 24 of the object is of comparatively high reflectivity. The projected pattern is thus reflected and a reflection (arrows $21_r$ and $22_r$) of that pattern is generated on a second (e.g. matte) surface 25 of the object. Such reflection comprises a component with opposite direction of the pattern in x-direction.

In particular, a captured image may be rectified against the projector. The acquired images thus may be transformed such that their pixel rows are aligned with the projector pixel rows, and the horizontal (=along baseline) projector pixel axis is thus also horizontal in the images. The vertical projector axis may be rotated due to an object surface slope, but will at least not change sign. Then, any other motion vectors can be indications of double reflections.

To probe the projector pixel axes one can project a pattern shifted to at least three positions: one to define the origin and two with a small shift in two non-parallel directions. Typically, horizontal and vertical shifts may be chosen. The pattern further can have structure in both the horizontal and vertical direction to allow correct motion estimation. The images can then be analyzed using algorithm for 2D motion estimation e.g. optical flow or phase-based motion estimation. Since the motion would only be analysed locally it is not required that the pattern is non-repetitive, thus a regular grid of dots or lines or a random dot pattern will suffice.

Instead of a 2D pattern and three images, it is also possible to project only a 1D pattern (e.g. fringe, stripe) but then use four images since the same origin-image cannot be used for both directions. The image analysis will in that case be different since the out-of-axis components will then be measured from the fringe direction in single images while the in-axis components are computed from the motion vectors between the two images.

Figure 8:
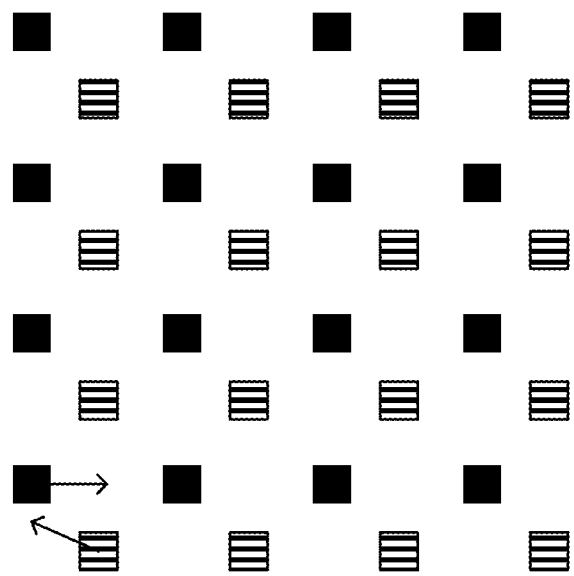
FIG. 8 shows a directly projected pattern represented by black solid dots and a respectively reflected pattern represented by striped dots with defined period.

In the end, the reflected pattern can be superposed with the direct pattern, and there may thus be multiple motion directions in a single neighbourhood. To be able to distinguish both motions, it is beneficial to use a kind of sparse pattern consisting e.g. of single bright pixel dots separated by three dark pixels so that the dots are clearly separated at least for some offset (FIG. 8). Multiple shifts (instead of just two as discussed above) will also help identify the two sets of dots and corresponding motions. The total shift could be e.g. one period in step of one pixel, so in total seven patterns to probe both projector pixel axes.

With FIG. 8 a direct pattern (directly projected) is represented by black solid dots and a respectively reflected pattern is represented by striped dots with a period equal of four spot widths.

The pattern could be coarse enough that features are not too blurred after reflection. At the same time, in cases where the ordinary fringe pattern gets totally blurred the reflection would no longer be a big problem. In the end, the projector axis probing pattern can have a period similar to that of the fringes in the regular pattern sequence, at least in case of a two-frequency pattern.

Alternatively or in addition, contrast and/or intensity distribution in an image can be analysed in order to identify direct and secondary illuminations at the object.

In a first illumination of the object with a fine pattern secondary reflections from shiny surfaces can be superimposed on the direct pattern on affected areas. The second reflection will be likely rotated to the first illumination. This can cause a quite strong reduction of the visibility and contrast of the pattern.

Figure 9A:
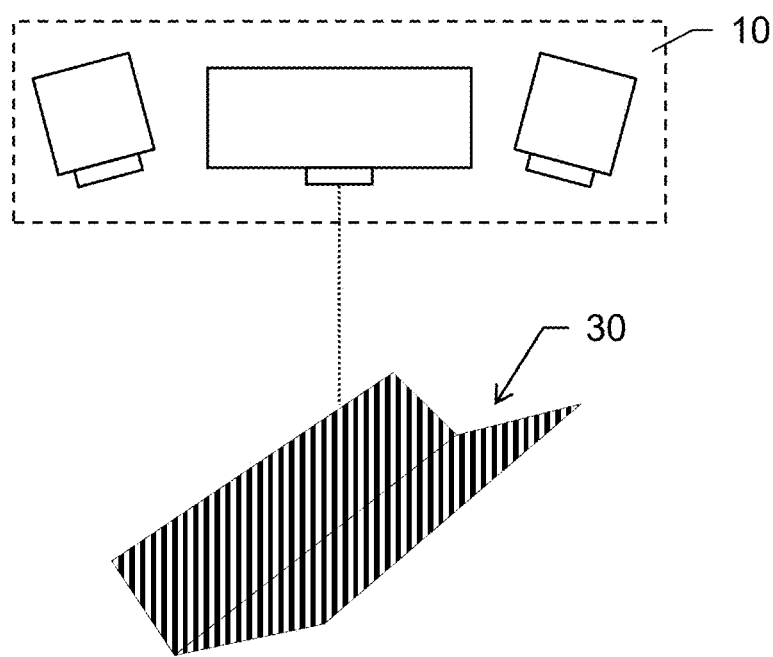
FIG. 9a-b show a homogenous fringe pattern which is illuminated on the object and a superposition with a respective reflection.

FIG. 9a shows a homogenous fringe pattern 30 which is projected onto the object (without double reflections).

Figure 9B:
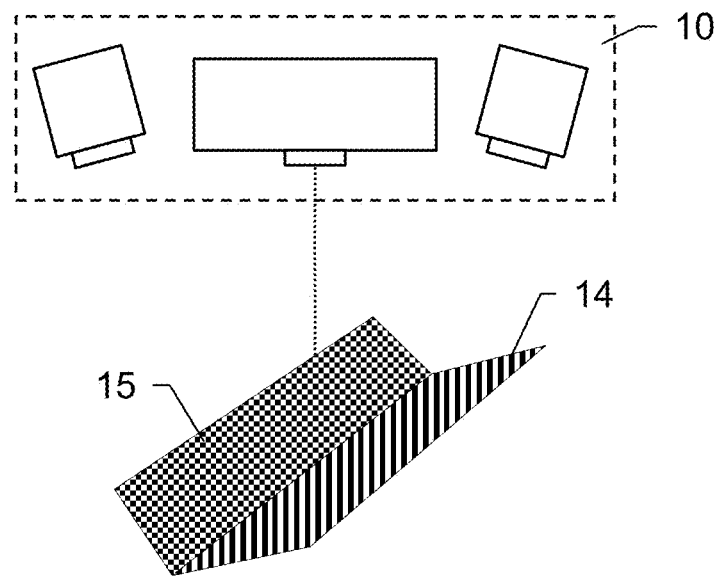

As can be seen in FIG. 9b, due to the reflection of the shiny surface 14 it comes to a double exposure on the matte neighbouring surface 15. This can have a significant impact on the observed pattern. The fringe contrast can be strongly reduced.

Also it may occur, that the reflection from the shiny surface 14 will be more blurry because typically also shiny surfaces 14 have a residual roughness scattering the incident light.

Hence, by projecting a sequence of binary fringe patterns 30 and analyzing the contrast sequence for each pixel one can conclude which pixels are affected by double reflections. Normally, if there is only the direct incidence of a fringe pattern one can expect two intensity values for the bright stripes and the dark stripes. A further indirect reflex from a shiny surface will add another two intensity values that yield in-total a new mixed intensity distribution, that is much broader and less pronounced.

By extending the analysis to small regions instead of single pixels one can further improve the sensitivity since the risk that several pixels show false negative results is small.

By analysis of the intensity distribution 30 over the object in small areas the impact of a second, indirect illumination becomes visible.

A further aspect of the invention relates to the use of a digital (CAD) model. In case a digital model of the object is available the object can be pre-scanned to identify the orientation (alignment) relative to the measurement system (triangulation sensor), and all reflex conditions can be identified if the surface characteristics are known (e.g. roughness, reflectivity of the projected wavelength). However, in reality these estimations are changing due to changing conditions of the test object over manufacturing processes.

The object can be split into surface regions of similar inclination angles (e.g. basically relating to the same surface normal) and this information can be used later on for adaptive illuminations in course of the measuring process.

The alignment of the digital model in accordance with the object can be done by several methods, e.g.:
  pre-scan with a line or a rough pattern,
  matching 2D features (edges, corners, bore-holes) by photogrammetry or
  manually by the user (rotation of the digital model).

Using a rough 3D model of the object, either obtained by a pre-scan or from a CAD model, the purpose of a segmentation is to divide the projection pattern into a number of segments which do not create double reflections within each segment. As mentioned above, one could e.g. split the object into surface regions of similar inclination angle since such surfaces cannot interfere over a single reflection.

Figure 10:
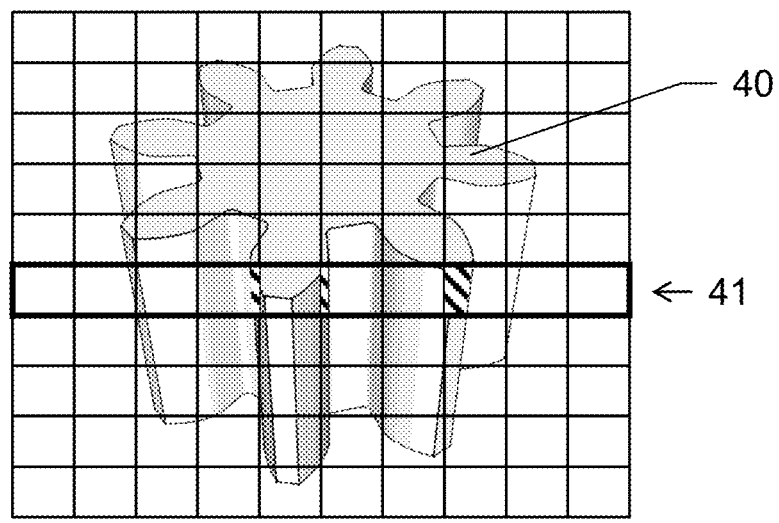
FIG. 10 shows a model-based principle of testing for inter-reflection between surfaces.

With FIG. 10 the principle of an alternative option to actively test for inter-reflection between surfaces is shown.

The model 40 of the object can be sliced by a regular grid in projector pixel coordinates. Then, for each grid cell one can further separate non-connected surfaces as shown in the marked row 41 of cells where the striped areas would be separated from the rest of each cell. After this pre-segmentation, each pre-segment would in turn be illuminated by the projector and respective images are analysed to see which other segments are affected by double reflections. As for instance only one binary pattern per segment is projected and the image quality does not need to be perfect, this can be done quite fast (e.g. as fast as the camera allows). E.g. 200 pre-segment images could be projected in one second using a 200 frames per second camera.

After the analysis of which pre-segments interfere, a smaller number of larger segments can be formed and can then be measured using the full fringe projection sequence. Each pattern in the sequence can then be masked to only illuminate the segment of interest, and only the area corresponding to the segment as seen by each camera may be analysed.

An alternative or additional non-automated method according to the invention is based on the selection by the user to identify critical areas that can cause double-reflections on other surfaces, either inside the CAD model or based on data available after a pre-scan of the object. If a CAD model is available, the selection could be based on the CAD geometry and done in 3D, otherwise the user could e.g. define the segments by drawing polygons onto a camera image, which would then be transformed to projector space by mathematical projection onto the rough 3D model.

Even without a rough 3D model, the user can manually select segments by drawing polygons, preferably in the images of both cameras so that the 3D shape of the polygon is known. It can then trivially be transformed to projector space.

Alternatively or additionally, to avoid having to select areas in two images, one approach is related to add a camera which is coaxial with the projector (optical axis of the camera is coaxial to the projection axis of the projector). Since this camera sees the scene from the same point as the projector projects, there is a fixed 2D-to-2D relationship between the respective camera image and the projected pattern. Hence, one could easily transform the selected area (in the camera image) to projector space without any 3D model. In such an image one could also perform segmentation based on 2D image features such as edges. In particular, alternatively to a coaxial alignment, it may be sufficient to place a small camera as close as possible to the projector.

A further option to avoid both the double selection and a further camera is to actively find each node point in the model polygon by iteratively adjusting the position of a projected single dot until the dot as seen by the camera is in the selected location. It can be only necessary to search in one degree of freedom thanks to the epipolar condition. For each user click on the camera image, the sensor can thus quickly scan the corresponding epipolar line to find the right position. This scan could either be done using a binary pattern (like the fringe projection it-self), by moving a single dot or iteratively reducing the size of a single line segment.

Yet another option is to let the user define the polygon directly in projector coordinates. To directly see where the node would end up from the view of each camera, the mouse pointer and/or the polygon so far can be projected onto the scene using the projector and then imaged live using the camera instead of showing it directly on screen.

By registering the shape of the polygon in the camera images, the software will also know which image areas to analyse when performing the measurement. In case of very strong reflections it may be necessary to in sequence project single points to the nodes of the polygon instead of the whole polygon at once.

Concerning an adaptive illumination to form the respective patterns (e.g. the striped segments) required for the methods above, a programmable pattern generator such as a DLP or LCD array can be used on side of the projection unit. Typically, such component can generate both a segment mask and a pattern or (fringe) pattern sequence. Fixed slides can also be used for generation of the pattern (e.g. in order to generate more accurate or higher frequency sinusoid patterns), wherein a DLP or LCD can be used only to define the masking area.

To further improve the robustness another (or more) projector can be added. One benefit of that is that it will be easier to avoid specular reflections. Often on shiny surfaces one of the cameras is blinded by specular reflections. If there is at the same time a double reflection which makes camera-projector triangulation unreliable it is difficult to acquire data. By having a second projector more points will be visible with good exposure and contrast in both cameras at the same time.

Instead of (or additionally to) figuring out the segmentation based on geometrical data or mapping of the double reflections, one could also measure difficult surfaces iteratively. Starting with illumination of the full area, the area can be iteratively reduced by excluding points as soon as they are captured with high enough confidence. Such process may be performed with the following steps:
1. Perform fringe projection measurement of remaining area (at start: full area);
2. Extract 3D points where measurement quality is good (no double reflections, proper exposure etc.);
3. Remove the corresponding pixels from the illuminated area for the next iteration;
4. Run another iteration (from step 1), repeat until all points are captured or maximum number of iterations reached.

By using an LCD or DLP projection method not only the projection pattern can be chosen flexible but also the areas to be illuminated. The problem of the double reflexes is the super-position of the direct pattern and the reflected one, what can cause severe errors in the computation of the 3D coordinates resulting in outliers or unmeasurable areas.

According to an embodiment of the invention segmentation or patch-fusion can be performed as follows. If having N patches or regions (e.g. in a grid) there are N×N combinations of source and target patches. All of these combinations can be analysed by projecting the N patterns while taking N images. Then, the goal is to by calculation (no new measurements) divide the patches into a minimal group of larger segments without internal crosstalk. One way to fuse the patches or regions is to start with a patch (the first one, randomly selected etc.) and patch by patch add more from the neighbouring ones until no more neighbouring crosstalk-free patches exists. Then, the patch fusion process is repeated starting at another unallocated patch. After the grouping of patches into segments, the segments can be analysed in the same way to combine sets of non-connected segments into even larger groups to further reduce the measurement time.

When fusing patches, the brightness of the patch can also be taken into account so that only patches with a similar brightness are in the same segment. Then, the exposure time can be optimised for each segment to limit the required camera dynamic range.

After dividing the projection image into segments as described above, each can be measured using standard fringe projection methods. For each of the segments, an additional quality check can also be done (as described above).

By one of the previously described methods to identify the critical areas that can cause reflections on neighbouring areas, these areas can be measured (illuminated) step by step in a further procedure:
1. First all areas are illuminated, wherein the dynamic of the system (defined by e.g. the sensitivity of the camera sensor, exposure time, aperture of the camera lens and brightness of the projector) has to be large enough so that the shiny surfaces are measurable. Areas that suffer from double reflexes can be ignored in the computation of the point cloud data in that step.
2. In a second step, only the areas that show double reflexes are illuminated and evaluated, i.e. respective point clouds are derived.
3. Afterwards both point cloud results are combined to one.

According to an embodiment of the invention a camera may be located so that the optical axis of the camera is coaxial with a projection axis of the projector. By that a parallax-free perspective can be provided.

The method to identify and taking care of surfaces with an appearance that shows ambiguity can be done either by cameras looking on the scene from an off-axis perspective or from an on-axis camera, that shows a parallax-free perspective. In case of an on-axis camera location the analysis of problematic surface can be easier done and more direct. A respective implementation can be provided by an additional camera and an optical setup to overlay the on-axis camera with the projection direction.

In order to make the evaluation of pre-scan data less complex, faster and more accurate it could be beneficial to have one camera which shares the field of view of the projector. With its nodal point at the same (virtual) location as the projector, there will be no parallax between the two and thus a one-to-one correspondence between camera 2D image coordinates and projector coordinates. Thus, no 3D-reconstruction or knowledge of a CAD model would be necessary to interpret the data since for each projected pixel it is known at which camera pixel a direct reflection of this light will be imaged, regardless of the shape of the object. In a preferred embodiment, such an on-axis camera that could be part of the projector would be only used to detect appearance ambiguity and not be used for triangulation measurement purposes.

Figure 11A:
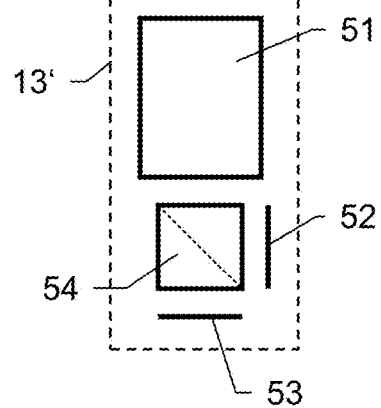
FIG. 11a-b show embodiments of optical systems according to the invention providing coaxial fields of view of a camera and a projector of a triangulation sensor.

In FIG. 11a such a setup is exemplarily illustrated where the same lens 51 is used for both a camera image sensor 52 and a projector object surface 53 of a triangulation-based fringe- or pattern projection optical sensor. In case the projector object surface (e.g. DLP or liquid crystal array) is not the same size as the camera image sensor, an extra adaptation lens (not shown) may be added e.g. in front of the image sensor 52 so the camera has at least the same field as the projector. The fields of view are combined by a beam splitter 54. In particular, in such embodiment the camera sensor 52 is part of the projector 13'. In other words, camera and projector may be integrally formed.

Figure 11B:
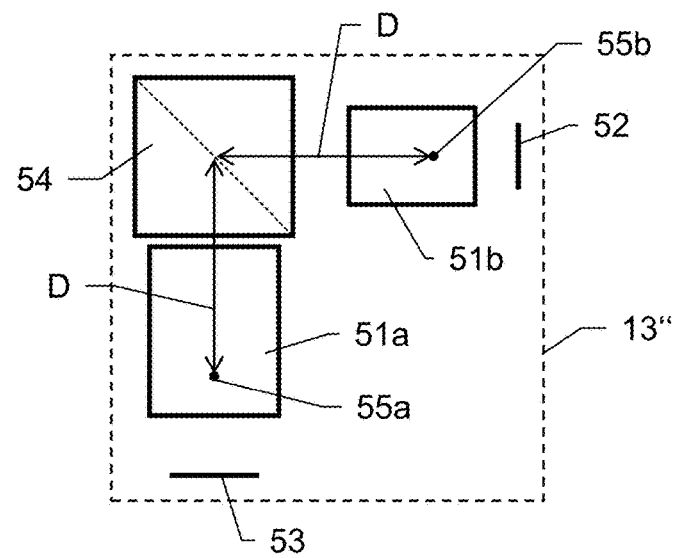

According to an alternative setup of FIG. 11b a beam splitter 54 is put in front of the projection lens 51a and there is a separate lens 51b for the camera. This camera lens 51b then would be adjusted so that its nodal point 55b is at the same or close to the same distance D from the beam splitter 54, i.e. at the same virtual location as the nodal point 55a of the projection lens 51a (parallax free observation). In particular, in such embodiment the camera sensor 52 is part of the projector 13". In other words, camera and projector may be integrally formed.

In general, according to respective embodiments of the invention, a number of patterns can be projected onto a scene to characterize the reflections within the object. Thanks to a coaxial camera setup, it is beforehand known which pixels of the camera are lit by the primary reflection. Any detected light in other pixels is thus due to interreflections or "cross talk". Using this information regarding the cross-talk between different areas of the projection space an optimal segmentation (defining regions with ambiguous reflections and regions without such ambiguity) of the scene can then be constructed.

The most reliable way to perform a scan would typically be to illuminate only one projector pixel at a time. This would however comparatively time consuming since a typical projector image consists of millions of pixels and the frame-rate of cameras used is typically not more than a few hundred images per second.

To speed up the measurement, one can illuminate sets of multiple pixels in the same illumination. By doing this, there is a risk that there are undetected reflections within such a pattern. Thus, a method to detect such internal reflections is proposed. After having determined which of the patterns that may have interreflections, one can then proceed with dividing them into multiple smaller sub-patterns with less risk of interreflection.

Figure 12:
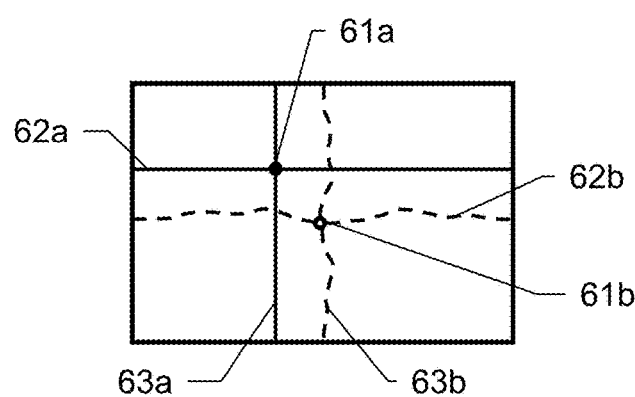
FIG. 12 shows an approach according to the invention of determining ambiguous reflections at an object by projecting orthogonal line patterns.

For instance, one could project long thin stripes at varying angles. For each stripe, the reflection may be a semi-continuous thin distorted stripe at some offset from the primary line. It is then not known which part of the illuminated stripe is the source for each part of the reflected line. By performing another scan with stripes at another angle, this information can be deduced. This is illustrated in FIG. 12. A determination of a source point 61a and destination point 61b of reflection by projection of orthogonal lines 62a and 63a is shown. The caused reflected orthogonal lines 62b and 63b are also shown.

For instance, one could also divide the projection image captured on side of the camera into larger patches or regions according to a grid. To help detect interreflections within each patch, the neighbouring pixels can be analyzed. If they show signs of cross-talk, there is also risk of an internal crosstalk, and the patch is divided into smaller sub-patches which are tested in the same way. Another way to detect internal cross-talk is to project a pattern with a finer structure (e.g. checkerboard pattern, a grid etc.) within the patch and check at the dark parts that there is no internal cross-talk.

Figure 13:
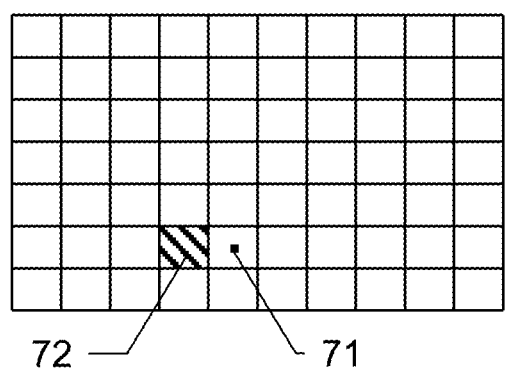
FIG. 13 shows a method according to the invention of how to fuse regions with similar reflection behaviours.

One could also perform a first scan using a single lit pixel but stepping the position of this pixel according to a coarser grid. Then, one can also detect very close inter-reflections which may otherwise be hidden within a larger solid patch, but instead one risks missing small reflection-causing features. By combination of single-pixel 71 and solid patch 72 illumination as illustrated in FIG. 13 one can preferably be able to detect both.

By calibrating a coaxially mounted camera relative to the projector it is possible to transform any projected image into a primary-reflection camera image using "image rectification" functions (which are typically used in computer vision to speed up stereo matching by aligning the pixel rows from two cameras), or vice versa to transform a recorded image to projector space. Thereby, lens distortion of both projector and camera are taken into account as well as e.g. image shifts, rotations etc. With a fixed set of patterns, this transformation can be done from projector to camera once for the full set of patterns, which later reduces the processing time compared to transforming images on demand.

Although the invention is illustrated above, partly with reference to some specific embodiments, it must be understood that numerous modifications and combinations of different features of the embodiments can be made and that the different features can be combined with each other or with triangulation approaches known from prior art.

The invention claimed is:

1. A method of identifying an object surface point or region of particular measuring properties for optical measurement of the respective point or region using an optical sensor which provides defined measuring conditions at least regarding emission of measuring light ($I_D$) and reception of reflected measuring light ($I_R$) in a defined spatial relationship, the method comprising:
defining a point or region of interest of the object;
determining a surface property related to a visual characteristic of the defined point or of at least a part of the defined region with respect to a particular optical measurement using the optical sensor; and
deriving an object information, wherein the object information includes information of measurability of the object with the defined measuring conditions based on the surface property, the object information representing an information about an expected effect on the particular optical measurement due to the surface property and measuring conditions,
wherein:
the point or region of interest is defined by use of a coaxial view to the object, the coaxial view includes a viewing axis of a camera being coaxial to an emission axis of the measuring light ($I_D$), and
determination of the surface property is performed by:
optically pre-measuring the point or region using the optical sensor by:
illuminating the point or at least a part of the region with the measuring light ($I_D$) emitable by the optical sensor,
capturing at least one image by means of the optical sensor of at least one illumination at the object caused by illuminating the object, and
analysing the at least one illumination regarding position or visual characteristic accuracy with respect to the measuring conditions of the optical sensor.

2. The method according to claim 1, wherein the optical pre-measuring comprises:
determining at least one image-position in the at least one image of respective illuminations at the object,
checking for positional accuracy of the at least one image-position with respect to the measuring conditions of the optical sensor, and
generating position accuracy information based on the checked positional accuracy.

3. The method according to claim 2, wherein:
generating image data of the at least one illumination, the image data comprising at least two pictorial representations of the at least one illumination at the object from at least two different poses,
determining the at least one image-position of the respective illuminations at the object for each of the pictorial representations, and
checking the image-positions for consistency regarding the measuring conditions.

4. The method according to claim 3, wherein:
checking if the image-positions represent a common illumination based on an illumination direction for the measuring light ($I_D$), and
comparing a spatial position derived by a triangulation-based determination based on the image-positions, with a position of an illumination axis or illumination plane of the measuring light ($I_D$).

5. The method according to claim 1, wherein illumination of the point or region is provided by the measuring light ($I_D$) being in form of:
a line of light,
a light pattern,
a light spot, or
a pattern with spatially successive bright and dark illumination regions.

6. The method according to claim 1, wherein the process of performing optical pre-measuring comprises:
moving the measuring light ($I_D$) over the object according to a defined scanning path,
continuously detecting a position of an illumination caused by the moving measuring light,
deriving a movement path for the illumination at the object,
comparing the scanning path to the derived movement path, and
generating position accuracy information based on the comparison.

7. The method according to claim 1, wherein the optical pre-measuring comprises:
analysing contrast or intensity of the at least one captured illumination,
comparing the contrast and/or intensity to a respective reference value, and
generating visual characteristic accuracy information based on the comparison.

8. The method according to claim 1, wherein defining the point or region of interest comprises:
defining a first polygon in a first camera view of the object,
defining a second polygon in a second camera view of the object, wherein the first and the second polygon define a common region at the object, and
deriving topographic information of the common region based on photogrammeric processing using the first and the second camera view.

9. The method according to claim 1, wherein the optical measuring is performed as a pre-scanning process of the point or region.

10. A non-transitory computer-readable medium comprising a computer program product having computer-executable instructions implemented for executing and controlling at least the step of determination of the surface property of the method of claim 1.

11. A triangulation-based optical sensor comprising:
a light emitting unit with a light source for providing defined measuring light ($I_D$) according to an emission axis;
at least one light receiving unit having a detector for detecting measuring light reflected and received from an object to be measured; and
a controlling and processing unit adapted to derive distance information based on the detected reflection,
wherein at least an arrangement of the light emitting unit and the light detection unit with known spatial position and orientation relative to each other defines measuring conditions of the optical sensor, wherein the triangulation-based optical sensor comprises a camera adapted to provide reception of the reflected measuring light ($I_R$) according to a viewing axis, wherein the emission axis of the light emitting unit and the viewing axis of the camera are coaxially aligned, and wherein the controlling and processing unit comprises a pre-measuring functionality executing a determination of an object surface property related to a visual characteristic of a defined point or of at least a part of a defined region of interest of the object with respect to a particular optical measurement using the optical sensor, the determination of the object surface property being performed by:

defining the point or region of interest by use of a coaxial view to the object by means of the camera and the light emitting unit, and optically pre-measuring the point or region of interest according to the following steps:

illuminating the point or at least a part of the region with the measuring light ($I_D$), capturing at least one image by means of the light receiving unit of at least one illumination at the object caused by illuminating the object, and analysing the at least one illumination regarding position or visual characteristic accuracy with respect to the measuring conditions of the optical sensor, or analysing a digital model of the object to be measured by performing the following steps:

digitally aligning the digital model in accordance with an orientation of the object relative to the optical sensor, and determining visual characteristic properties of the point or region based on the aligned model regarding an illumination with the measuring light ($I_D$) in the orientation of the object relative to the optical sensor.

12. The triangulation-based optical sensor according to claim 11, wherein:

the light emitting unit is embodied as a projector and defines an emission axis, the triangulation-based optical sensor comprises a camera which defines a viewing axis, and a projector object surface of the projector and a camera image sensor of the camera which are arranged so that the emission axis and the viewing axis are coaxially aligned.

* * * * *